US012734887B2

(12) United States Patent
McCarthy

(10) Patent No.: US 12,734,887 B2
(45) Date of Patent: Sep. 15, 2026

(54) DIAGNOSTIC TESTING MODULE FOR CONTROLLING AN ELECTRONIC CONTROL UNIT OF AN AUTOMOBILE ENGINE

(71) Applicant: David McCarthy, Mount Martha (AU)

(72) Inventor: David McCarthy, Mount Martha (AU)

( * ) Notice: Subject to any disclaimer, the term of this patent is extended or adjusted under 35 U.S.C. 154(b) by 0 days.

(21) Appl. No.: 18/877,276

(22) PCT Filed: Jun. 6, 2024

(86) PCT No.: PCT/AU2024/050599
§ 371 (c)(1),
(2) Date: Dec. 20, 2024

(87) PCT Pub. No.: WO2024/254637
PCT Pub. Date: Dec. 19, 2024

(65) Prior Publication Data

US 2025/0262940 A1 Aug. 21, 2025

(30) Foreign Application Priority Data

Jun. 13, 2023 (AU) ................................ 2023901865

(51) Int. Cl.
*B60K 35/90* (2024.01)
*B60K 35/21* (2024.01)

(52) U.S. Cl.
CPC ............ *B60K 35/90* (2024.01); *B60K 35/213* (2024.01)

(58) Field of Classification Search
CPC ............................. B60K 35/90; B60K 35/213
See application file for complete search history.

(56) References Cited

U.S. PATENT DOCUMENTS 4,757,463 A * 7/1988 Ballou .................. G01M 15/05 701/99
5,555,498 A * 9/1996 Berra .................. G06F 11/2733 701/34.3

(Continued)

FOREIGN PATENT DOCUMENTS

CN 101338723 A * 1/2009
CN 202746084 U * 2/2013

(Continued)

OTHER PUBLICATIONS

DYNOJET—Power Vision 3 (various models available) [retrieved from internet Aug. 14, 2024] Website—Power Vision <URL: https://www.dynojet.com/dynojet-motorcycle-power-vision/> Published Jan. 11, 2021 as per Wayback Machine Features Video <URL: https://www.youtube.com/watch?v=KI-2aZbuQAo&t=1s > Published Mar. 29, 2022 Installation Guide <URL: https://www.dynojet.com/amfile/file/download/file/119/category/130/> Published Oct. 6.

*Primary Examiner* — Chico A Foxx

(57) ABSTRACT

The present invention is a diagnostic testing module for controlling an electronic control unit of an automobile engine. The module has a processor, a housing for the processor, an adaptor cable for connecting the processor to the electronic control unit, a user interface screen for controlling the processor of the module and presenting data to the user and an antenna to transmit data. The module is characterized in that the module has a mount for attaching the housing to the automobile so that the module can travel with the automobile. The module is further characterized in that the processor is programmed to generate a key code for the electronic control unit, transmit the key code to the electronic control unit, allow a user to change a parameter of the engine using the user interface screen, display the current outputs of the engine via the user interface screen and transmit the changed parameter to the electronic control unit, (Continued)

and read fault codes produced by the engine control unit and enable a user to activate components of the engine to test those components and display their current outputs.

2 Claims, 13 Drawing Sheets

(56) References Cited

U.S. PATENT DOCUMENTS 5,608,632 A 3/1997 White
5,908,455 A * 6/1999 Parvahan ................ B60T 8/885 701/32.7
6,212,483 B1 * 4/2001 Carew ..................... G06F 1/183 701/34.2
6,225,898 B1 * 5/2001 Kamiya ................. G07C 5/008 340/505
6,233,509 B1 * 5/2001 Becker ................. G07C 5/0808 701/32.7
6,236,917 B1 * 5/2001 Liebl .................... G07C 5/0808 701/32.8
6,237,400 B1 * 5/2001 Takakura ............. G01R 31/006 73/114.61
6,529,808 B1 * 3/2003 Diem ................... G01R 31/006 701/33.6
6,539,299 B2 * 3/2003 Chatfield .............. F02D 41/263 701/115
6,816,760 B1 * 11/2004 Namaky ............. G06F 11/2733 701/33.2
7,505,837 B2 * 3/2009 Somos .................. G01M 17/00 701/33.9
7,620,484 B1 * 11/2009 Chen .................... G07C 5/0808 701/31.5
8,296,008 B2 * 10/2012 Sampson ............... G07C 5/008 701/32.7
11,257,307 B1 * 2/2022 Herron ................. G07C 5/0808
12,014,587 B1 * 6/2024 Herron ................... G01R 27/02
2002/0193925 A1 * 12/2002 Funkhouser ......... G07C 5/0808 701/31.8
2002/0194537 A1 * 12/2002 Ali ...................... G06F 11/2252 714/25
2004/0016804 A1 * 1/2004 Namaky .............. G07C 5/0816 235/435
2005/0149570 A1 * 7/2005 Sasaki .................... G06Q 10/06
2006/0068644 A1 * 3/2006 Zauber ................. H01R 13/533 439/654
2006/0287806 A1 * 12/2006 Hori ......................... G01D 3/08 702/116
2009/0043446 A1 * 2/2009 Drew ..................... B60K 35/85 340/438
2009/0210118 A1 * 8/2009 Takamoto .............. B62M 25/08 701/49
2009/0259358 A1 * 10/2009 Andreasen ........... G07C 5/0808 701/31.4
2009/0265057 A1 * 10/2009 Chinnadurai .......... G07C 5/085 701/31.4
2010/0204878 A1 * 8/2010 Drew .................. B60R 16/0232 701/31.4
2010/0205450 A1 * 8/2010 Sarnacke ................ B60R 25/00 713/185
2012/0046826 A1 * 2/2012 Panko .................. G07C 5/0883 702/81
2012/0259533 A1 10/2012 Nicosia et al.
2013/0246135 A1 * 9/2013 Wang ...................... G06F 17/00 701/2
2014/0019000 A1 * 1/2014 Ruther ................ G01M 17/007 701/31.4
2015/0081163 A1 * 3/2015 Molenkamp ............. G07C 5/00 701/33.2
2016/0160780 A1 * 6/2016 Garrard .................. G07C 5/006 701/29.2
2020/0302708 A1 * 9/2020 Thompson ........... G07C 5/0825
2021/0241548 A1 * 8/2021 Maurer .................. G07C 5/008
2022/0144291 A1 * 5/2022 Guha ................... G07C 5/0825

FOREIGN PATENT DOCUMENTS

CN 104598654 A * 5/2015
CN 108107360 A * 6/2018 ........... G01R 31/343
CN 109257374 A * 1/2019 ......... H04L 63/0428
CN 115546923 A * 12/2022 ........... G07C 5/0808
CN 116227788 A * 6/2023 ......... G06Q 10/0639
CN 117420433 A * 1/2024 ............. G01R 31/34
EP 1617064 A2 * 1/2006 ........... F02D 41/263
EP 2317480 B1 * 12/2018 ........... H01R 31/065
EP 4063641 A1 9/2022
GB 2483868 A * 3/2012 ............. H01R 13/73
JP H0916255 A * 1/1997
WO 2018098545 A1 6/2018
WO 2019232636 A1 12/2019

* cited by examiner

DIAGNOSTIC TESTING MODULE FOR CONTROLLING AN ELECTRONIC CONTROL UNIT OF AN AUTOMOBILE ENGINE

TECHNICAL FIELD

The present invention relates to the automobile industry and, more particularly to a diagnostic testing module for controlling an electronic control unit of an automobile engine. The module is particularly useful for motorcycles but can also be used for other automobiles such as jet skis, snow mobiles, snow bikes, side by side buggies, utility terrain vehicles and quad bikes.

BACKGROUND

Automobiles have an electronic control unit for their engines. These units control the inputs into the engine, such as the fuel, ignition and oil rate usage. These inputs can influence the performance and reliability of both two stroke and four stroke engines. Two stroke motorcycle engines have a power valve (unlike four stroke engines) which improves the spread of power of the motorcycle across the revolutions per minute (rpm) range of the vehicle. The power valve can also be controlled by the electronic control unit. The power valve partially closes off the exhaust port at low rpms and opens up the exhaust port at high rpms. By doing so, the power valve gives the best low rpm power and the best high rpm power to the two-stroke engine of a motorcycle. Most motorcycles use a fuel injection system, but other motorcycles can use a carburettor. On motorcycles that feature a carburettor, the electronic control unit can still be used to control some parameters (such as the ignition advance, power valve position and the oil rate usage), but not the fuel usage rate.

Automobile engines are tuned during production in their factory to have certain performance characteristics. These performance characteristics are commonly referred to as "maps". The maps are a data set which can represented in spreadsheet or graphical form. For each rpm of the engine, there is a range of data sets including for the fuel usage, ignition advance, oil usage and power valve position, versus the throttle position. This data set creates a line when represented graphically. A set of lines for each rpm create an array of lines which can be displayed as a three-dimensional wave pattern. There can also be maps for each rpm of the engine versus other factors such as engine pressure, or engine temperature, ambient air temperature, and ambient air pressure. These maps control the performance of the engine.

There are different types of motorcycles. These include on-road motorcycles, off-road motorcycles (which can be used on road and off road), so called 'enduro' bikes (which are intended to be used off-road) and pure racing bikes. All these bikes need to be tuned differently.

There is a need for different tuning maps for different situations. Different track conditions will require different maps in order to get the best lap times and/or user experience for the rider. For example, tracks with sand require a different map to a track with a lot of mud. Tracks with sand require more power from the motorcycle, but sand tracks also generate a lot more engine heat (which can damage the engine). The map can be changed to control the amount of fuel and ignition in the engine to control the amount of heat in the engine. Wet tracks (including with mud or clay) are slippery, so the rider needs less power from the engine to avoid braking traction and the highest-level smoothness in power delivery to avoid wheel spin and skidding. Loss of traction makes the bikes slide and can result in accidents when the user comes out of a corner too fast. It can also result in slower lap times in a racing setting. There is a 'sweet spot' of tuning for each road condition.

During production, the maps of the motorcycles are typically tuned for safety and emission-reduction (to comply with pollution regulations) when the bike is used on the road (as opposed to off-road). However, these tuning maps do not necessarily create the best performance of the bike when off-road bikes are used off-road, rather than on the road.

Some motorcycles can be underpowered, and some are overpowered. Beginner riders tend to complain that a motorcycle has too much power and they want less. However, the problem tends to be not that the bike does not has too much power, but the power is not being delivered smoothly as the rpm is increased. This reduces the user experience. The bike becomes more difficult to control (that is, maintain traction or deliver power to the ground). On the other hand, experienced riders often want more power and improved smoothness (particularly in racing conditions).

Factory tuned bikes can be unresponsive and have inconsistent power delivery (so that the ride is 'jerky' and not smooth). The engines can sometimes appear unresponsive which can create a 'sluggish' feeling. The engine does not seem 'happy'. Factory tuning creates a lot more wheel spin and loss of traction because you have to open the throttle to a greater extent to get the engine run more smoothly, but then the power suddenly comes on very abruptly. This reduces the user experience.

Technically a user is not legally supposed to modify a motorcycle's tuning when using it on the road. However, there is no easy means of changing the tuning when switching between off road and on road conditions.

In order to change the maps of the bike, the electronic control unit needs to be electronically modified by computer. However, not every mechanic has the skills to change the maps of the bike. It requires a highly specialised skill which is rare. The mechanic must have not only a knowledge of the hardware, but also of the software maps that run the engine and how to modify them in a safe and effective way. Only around 5% of the motorcycle mechanic's workshops would have the technology to change the tuning maps of the motorcycles, and only around 1% of motorcycle mechanics would also have the knowledge to do so.

The tuning of the motorcycle is usually done in a workshop using a dynamometer to measure the output of the engine as the maps are changed. A dynamometer is expensive apparatus (which typically cost about AU $50,000). They consist of a metallic structure in which the bikes are placed through a ramp. The bike is tied to the dynamometer by the front wheel through a clamp that can be moved ahead and back with the purpose of fitting the position of the back wheel. This wheel is placed over a solid roller of steel that is fixed on the structure with two bearings. The dynamometer is usually placed in a soundproof and ventilation-controlled room. Because the dynamometer is so expensive and the technical knowledge to operate it is so rare, most people never tune their bikes. In any event, the final tuning of the bike should be done on a track to ensure that the testing done on the dynamometer reacts correctly in real world conditions. Fundamentally, there is a need for a simpler method of tuning a bike.

The object of the present invention is to provide a means for a user to easily, independently and effectively tune their bike.

SUMMARY OF THE INVENTION

According to the present invention, there is provided a module for controlling an electronic control unit of an engine of an automobile, the module comprising:

(a) a processor;

(b) a housing for the processor;

(c) an adaptor cable for connecting the processor to the electronic control unit;

(d) a user interface screen for controlling the processor of the module and presenting data to the user;

(e) a mount for attaching the housing to the automobile so that the module can travel with the automobile, wherein the processor is programmed to:

i. generate a key code for the electronic control unit;

ii. transmit the key code to the electronic control unit;

iii. allow a user to change a parameter of the engine using the user interface screen; and iv. display the current outputs of the engine via the user interface screen;

v. transmit the changed parameter to the electronic control unit.

vi. read fault codes produced by the engine control unit.

Preferably, the module can clear fault codes produced by the engine if those faults have been rectified.

The module preferably has an antenna to transmit data to a remote computer device of a user.

The data preferably includes an algorithm required to create the key code to unlock the electronic control unit of any particular automobile. The parameters of the engine may include fuel usage, ignition advance, oil usage and power valve position.

The user interface screen is preferably a touch screen. The user interface screen may be on a mobile device of the user.

The module preferably logs data engine outputs and transmits the data to the mobile device of the user.

Any of the features described herein can be combined in any combination with any one or more of the other features described herein within the scope of the invention.

BRIEF DESCRIPTION OF DRAWINGS

Embodiments of the invention will be described with reference to the following drawings, in which.

DETAILED DESCRIPTION

Figure 1:
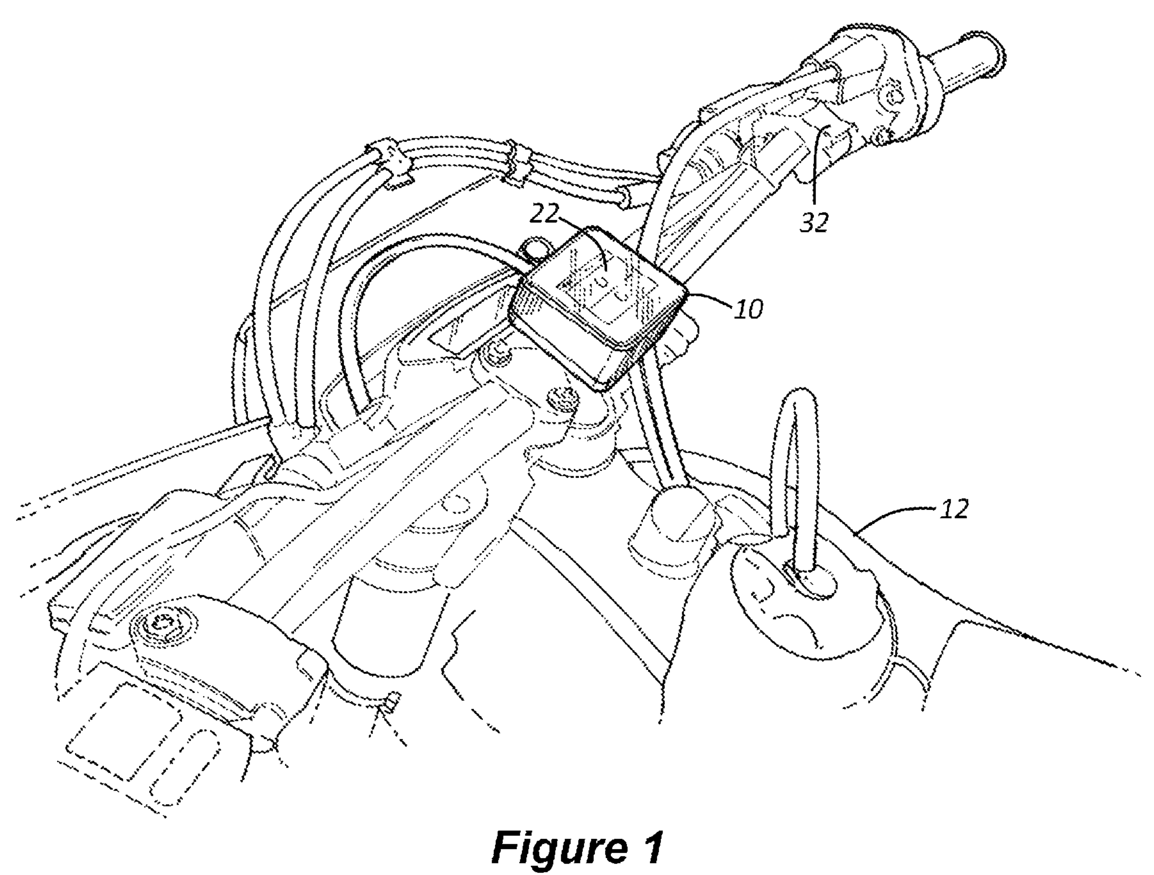
FIG. 1 is perspective view of a module for controlling an electronic control unit of an engine of a motorbike automobile.
Figures 2, 3:
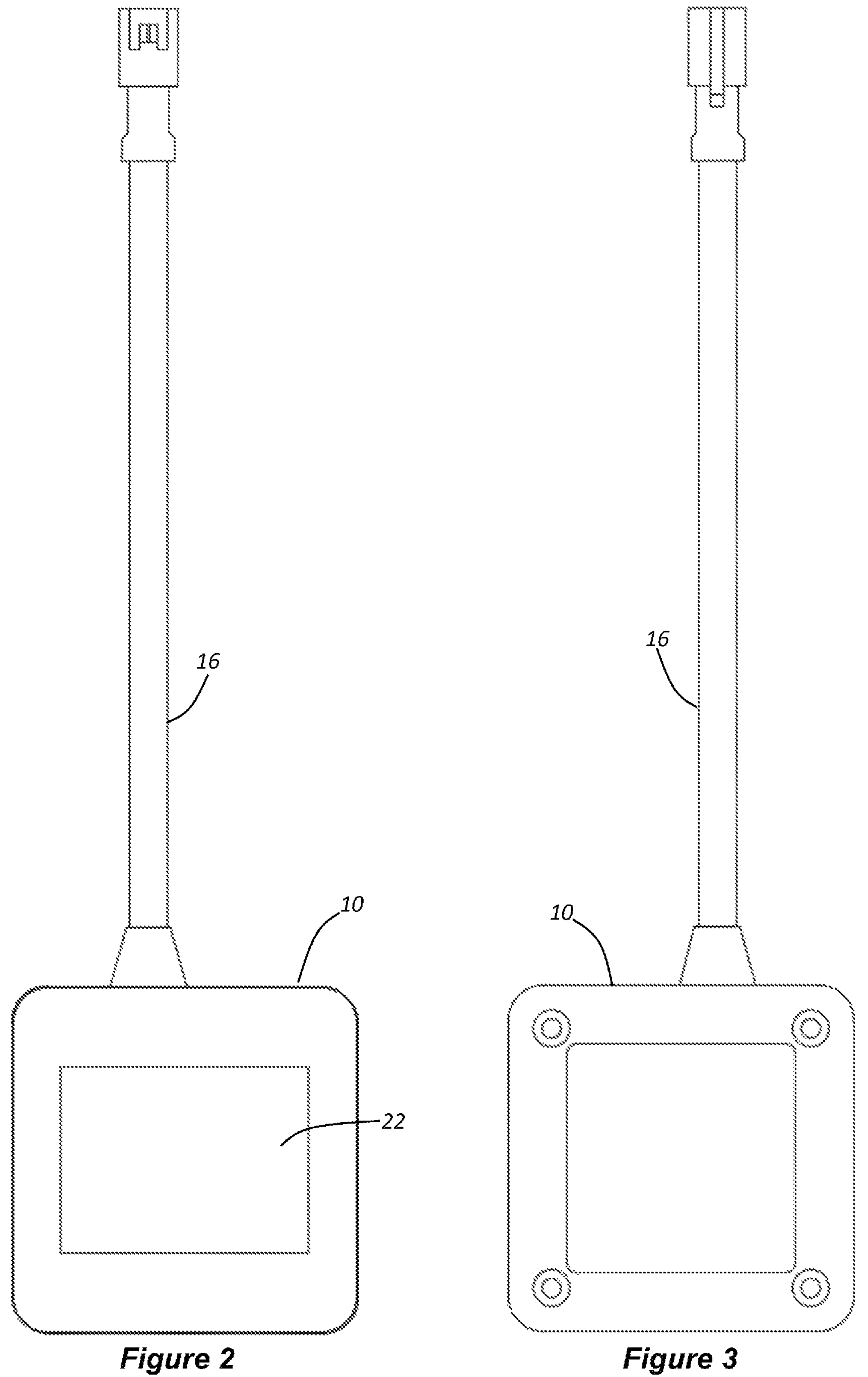
FIG. 2 is a front view of the module of FIG. 1.
FIG. 3 is a rear view of the module of FIG. 1.

FIG. 1 shows a module 10 for a motorbike 12 as an exemplary automobile. The module 10 can also be used on other automobiles such as jet skis, snow mobiles, snow bikes, side by side buggies, utility terrain vehicles and quad bikes.

The module 10 has a processor 14 (not shown) located within the module 10. The module 10 has an adaptor cable 16 for connecting the module 10 to the electronic control unit 20 (not shown) of an engine (not shown) of the motorbike 12. The electronic control unit 20 is not shown in the drawings but is usually located underneath the seat of most motorbikes.

The module 10 has a user interface screen 22 for controlling the processor 14 of the module 10 and presenting data to the user.

Figure 4:
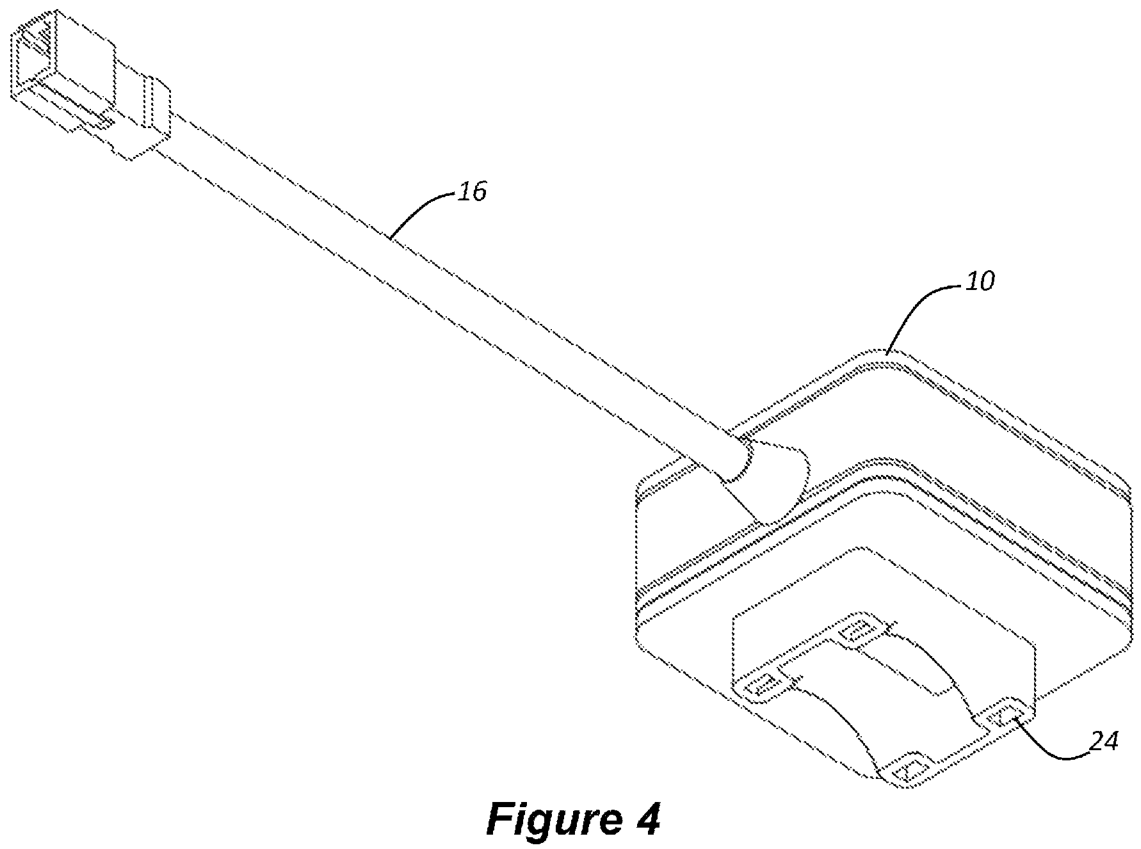
FIG. 4 is a perspective view of the underside of the module of FIG. 1.
Figure 5:
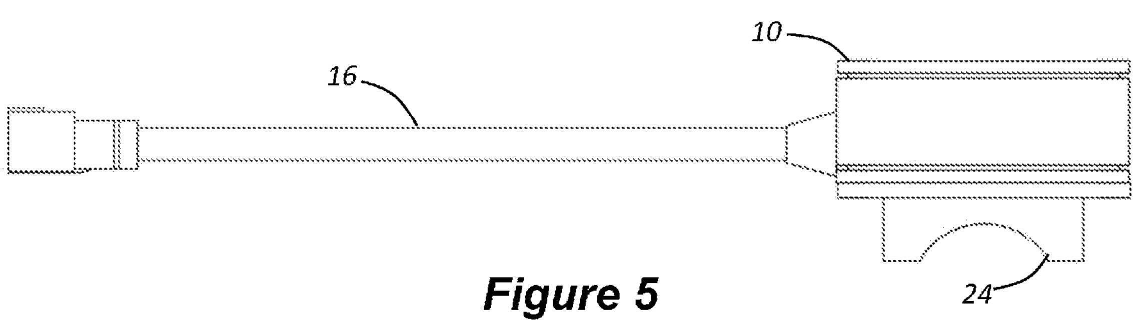
FIG. 5 is a left side view of the module of FIG. 1.
Figure 6:
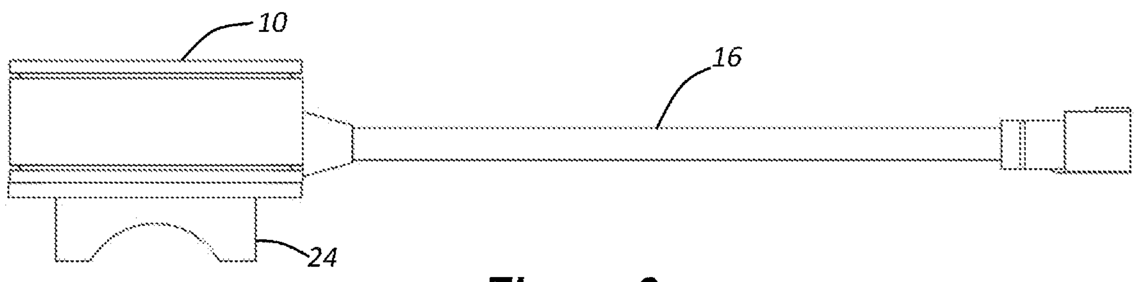
FIG. 6 is a right-side view of the module of FIG. 1.

As shown in FIGS. 4 to 6, a mount 24 is used to attach the module 10 to the handlebars of the motorbike 12. The mount 24 ensures that the module 10 stays on the motorbike 12 whilst the motorbike 12 is in motion. The mount 24 distinguishes the present invention from the prior art because it allows a user to manipulate the electronic control unit 20 whilst the motorbike 12 is in use and away from a workshop.

The processor 14 is programmed to generate a key code for the electronic control unit 20 of the motorbike 12 and transmit the key code to the electronic control unit 20 of the motorbike 12. Without the correct key code, it is not possible to reprogram the electronic control unit 20.

The module 10 has a key generator which is programmed with an algorithm to unlock the electronic control unit 20. The algorithm is specific to each type of electronic control unit. Each family of electronic control units requires a different algorithm. The algorithm generates the key to unlock the electronic control unit.

The algorithms can be updated remotely to the module 10 via software patch updates, which can be downloaded to the module 10 via a mobile phone or computer of the user. The module features a library of different algorithms for different models of automobiles, so that the user can select and download the correct algorithm for their automobile.

The module 10 allows a user to change the parameters of the electronic control unit 20 of the engine of the motorbike 12 using the user interface screen 22.

Figure 7:
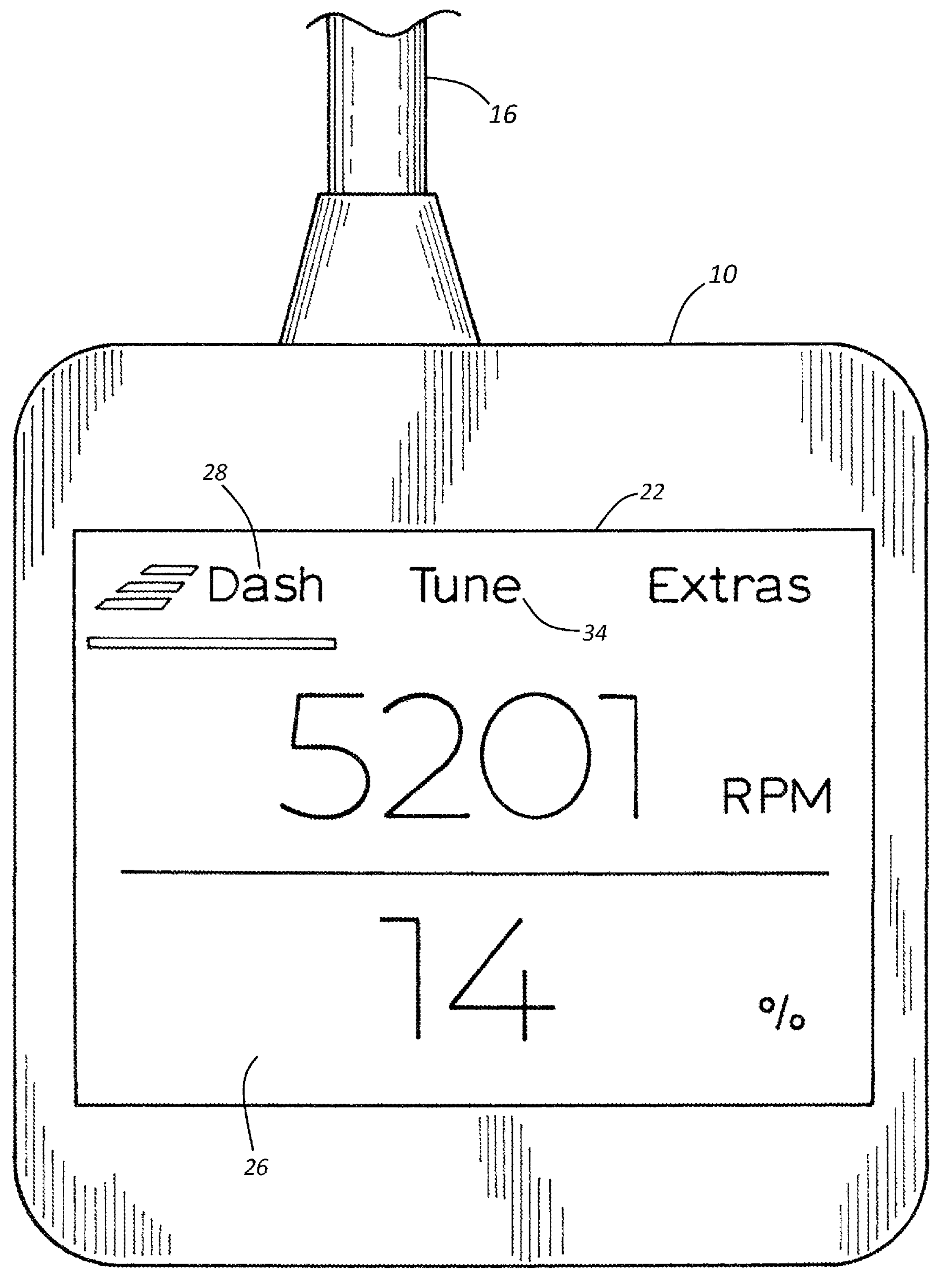
FIG. 7 is a representation of the first dash interface of the module of FIG. 1.
Figure 8:
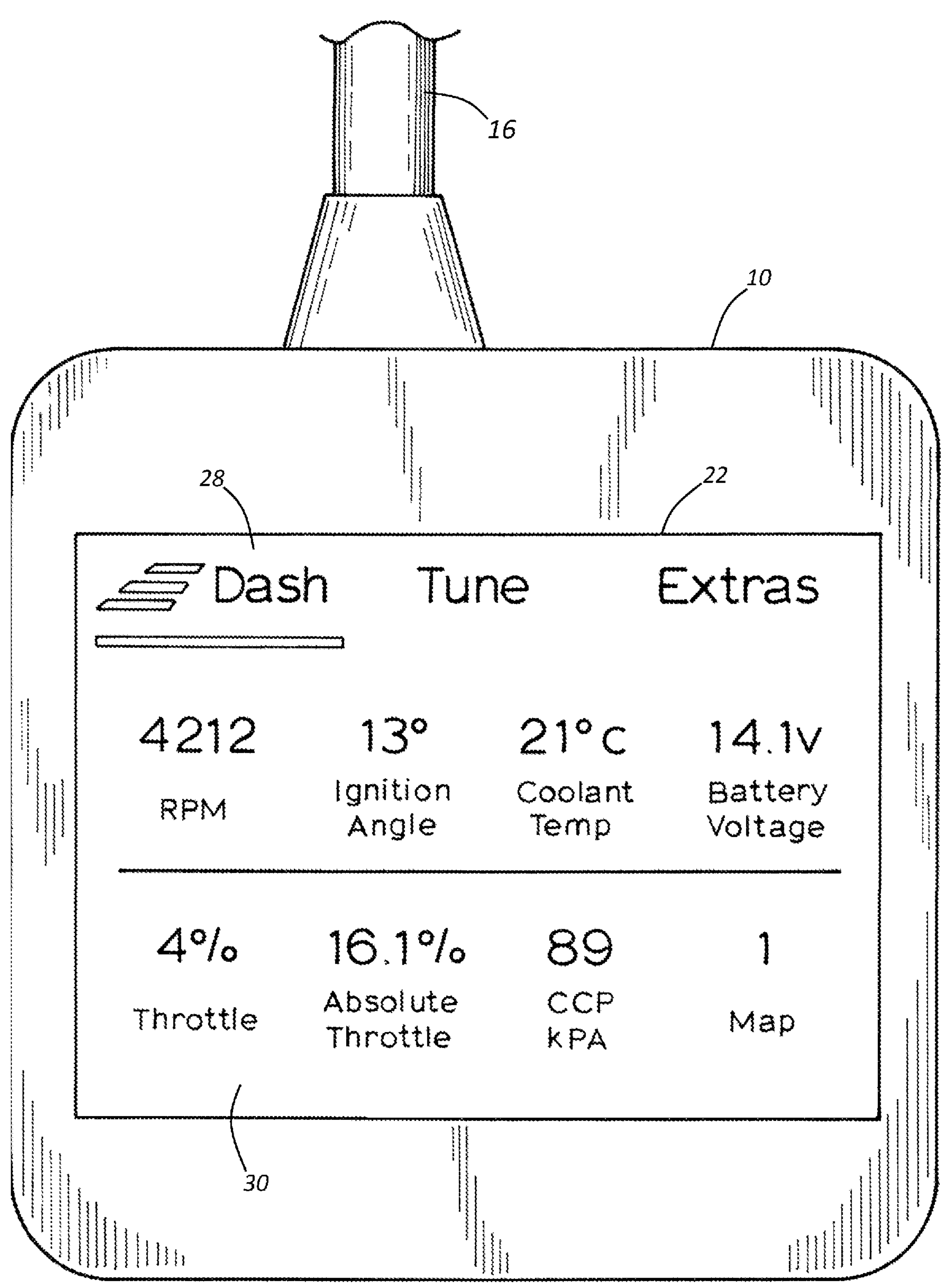
FIG. 8 is a representation of the second dash interface of the module of FIG. 1.

As shown in FIG. 7, the screen 22 has a first dash interface 26 which is accessible via the dash tab 28. The first dash interface 26 shows the Revs Per Minute (RPM) of the motorbike 12 and the percentage opening of its throttle. In the example shown in FIG. 7, the throttle is open to fourteen percent and the revs per minute is at five thousand two hundred and one. If the user swipes across the screen 22, then the user is taken to a second dash interface 30 shown in FIG. 8.

The second dash interface 30 shows more data to the user, including the RPM, the ignition angle (in the example of FIG. 8, the angle at which the spark is firing when the crank shaft is thirteen degrees before top dead centre), the coolant temperature is at twenty one degrees Celsius, the battery voltage is at fourteen point one volts, the throttle is open to four percent of its capacity, the absolute throttle is open to sixteen point one percent (that is, when the engine is in the idle position and throttle is at the zero position for the user, the throttle is still open to allow air into the engine so that it can idle, but the absolute throttle position takes this into account-so that in this example, four percent throttle opening is actually equal to sixteen point one percent absolute throttle opening), the crank case pressure inside the engine is at eighty nine kilopascals, and the electronic control unit has map one running (that is, the electronic control unit may have multiple maps for different running states of the engine, which designate different fuel, ignition and oil parameters). The different maps can be selected by the user using a switch 32 on the handlebars of the motorbike 12 (see FIG. 1).

Figure 9:
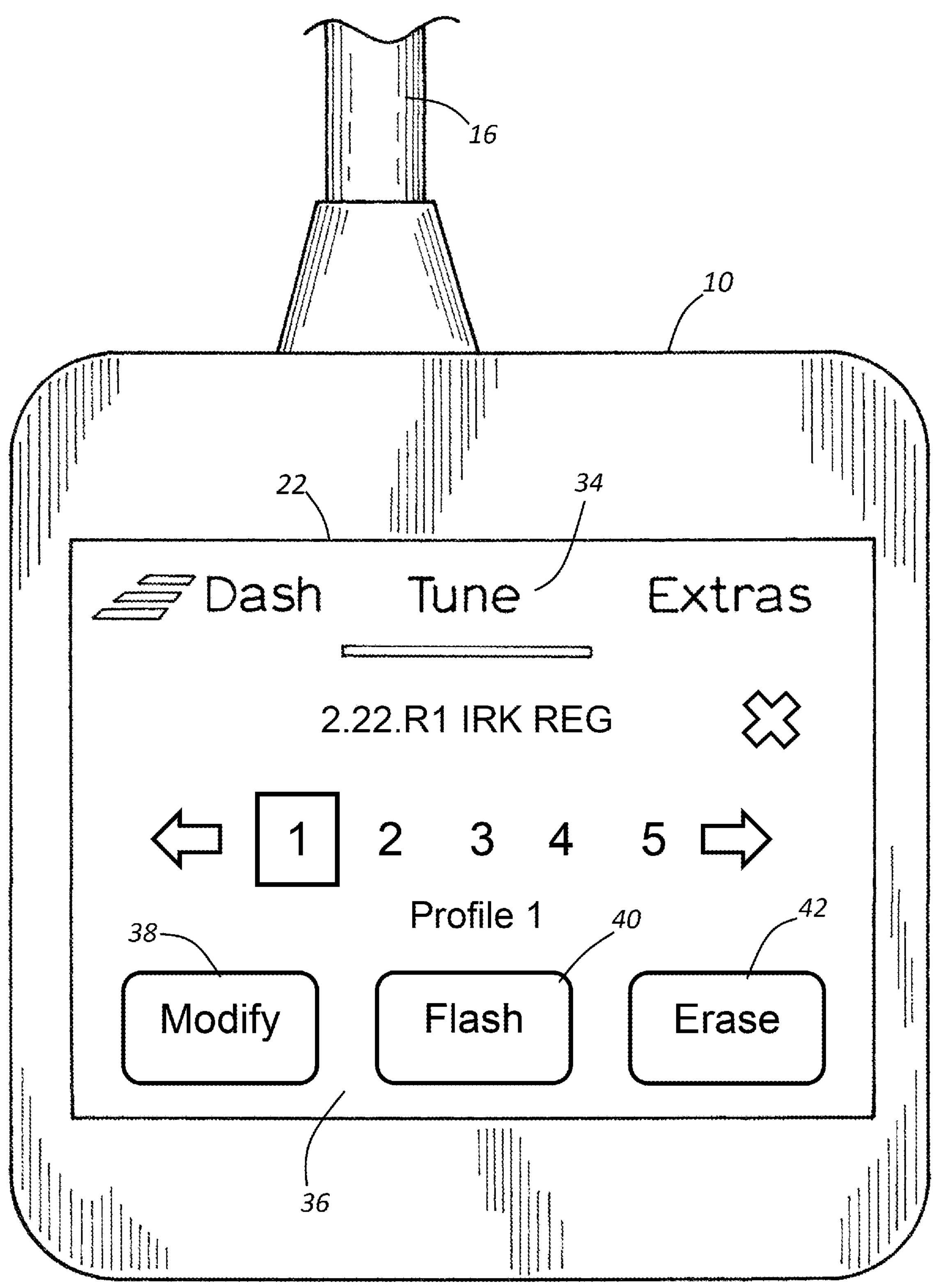
FIG. 9 is a representation of the tune interface of the module of FIG. 1.

Referring to FIG. 7, the user can select the tune tab 34 which takes the user to the tune interface 36 shown on FIG. 9. The tune interface 36 enables a user to select a map profile for the electronic control unit of the engine of the motorbike 12. In FIG. 9, profile one is selected. The modify button 38 allows a user to modify the engine parameters defined in profile one. The flash button 40 makes the module 10 transmit the modified profile to the electronic control unit 20 of the engine. The erase button 42 erases the selected profile.

Figure 10:
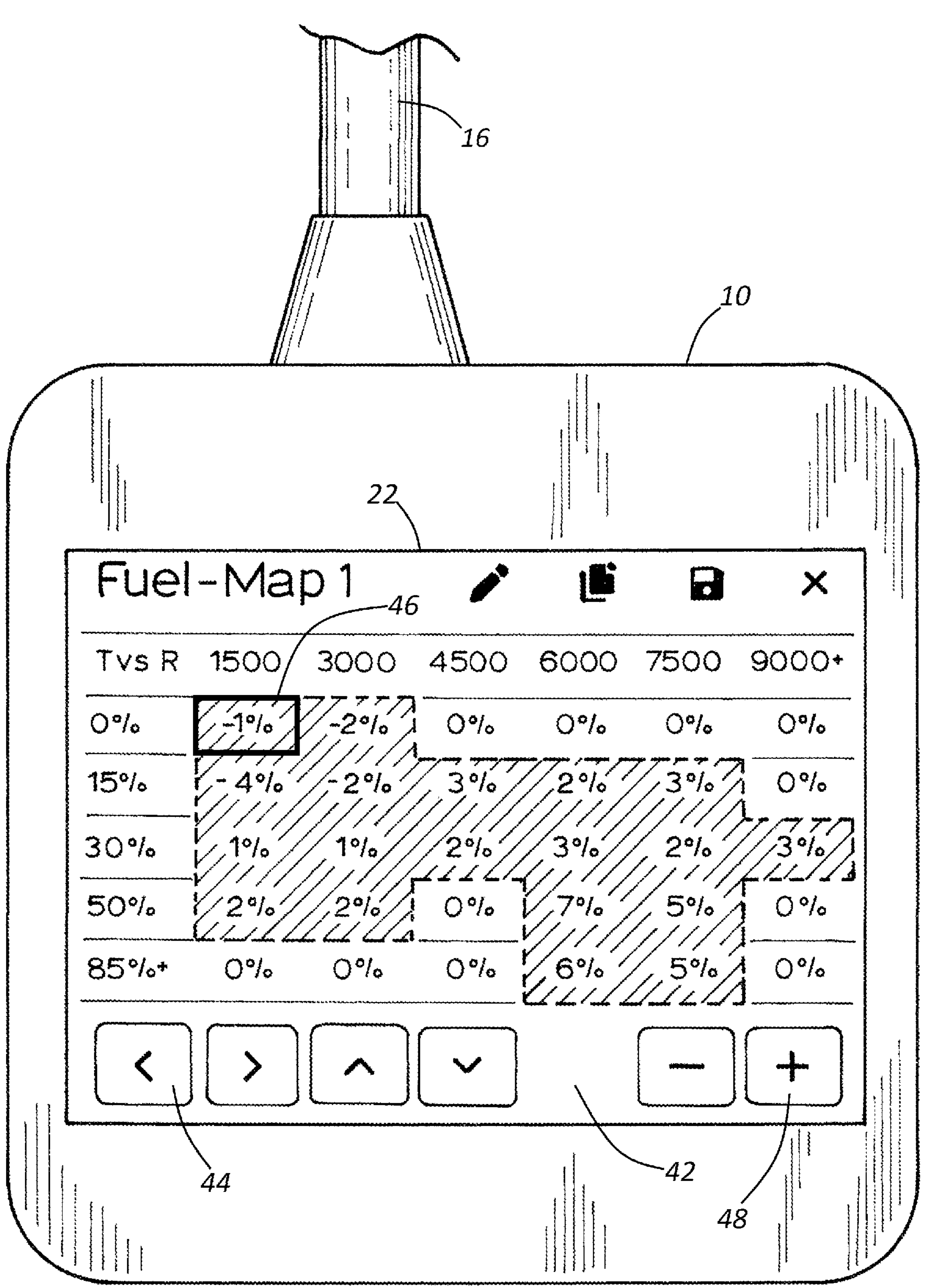
FIG. 10 is a representation of the fuel map interface of the module of FIG. 1.

FIG. 10 shows the fuel map interface 42 which is accessible by the user after hitting the modify button 38 (shown in FIG. 9). A user can use the arrow buttons 44 on the fuel map interface 42 to select any that the user is interested in modifying. In the example of FIG. 10, the cell 46 has been selected by the user. The plus/minus buttons 48 can be used to modify the selected cell 46. Each cell relates to a combination of throttle position and RPM. In the example of FIG. 10, the cell 46 is set at fifteen hundred RPM and zero percent throttle. A value of minus one percent has been entered in cell 46, which means that when the engine is operating at fifteen hundred RPM and zero percent throttle the electronic control unit 20 will now give one percent less fuel in the operating condition of fifteen hundred RPM and zero percent throttle.

Once a cell has been modified, it is highlighted (shown as cross hatched cells in FIG. 10) to indicate to the user that the parameter has been changed.

Figure 11:
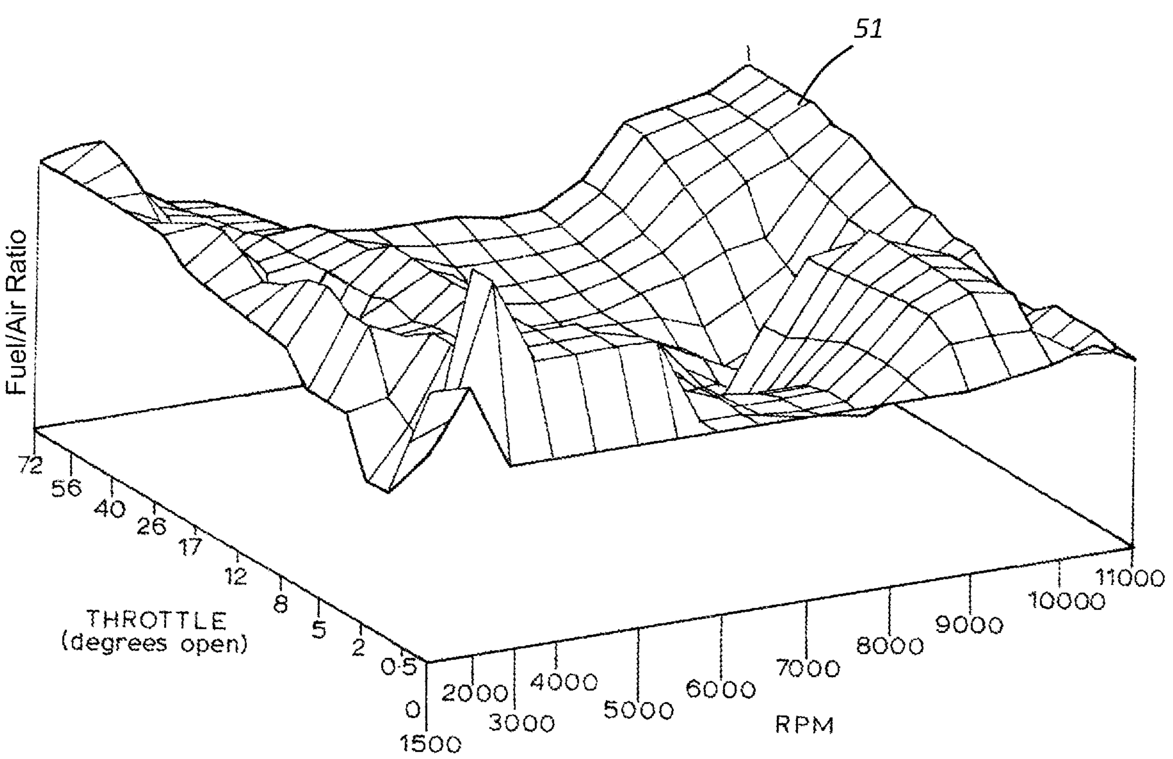
FIG. 11 is a fuel map waveform controlled using the fuel map interface of FIG. 10.

The data tabulated in the fuel map interface 42 of FIG. 10 can be represented graphically as shown in FIG. 11. Each different set of parameters will alter the waveform 51. The waveform 51 shows all the assigned fuel to air ratios for each the throttle and RPM position. A skilled user could recognise whether a waveform 51 was functional or dysfunctional and correct it accordingly using the module 12. In a preferred form of the invention, waveform data can be presented to the user on the mobile phone which receives data via Bluetooth from the module 10. A map is formed by sets of waveforms which define the operating parameters of the electronic control unit 20. There will be other waveforms for ignition, oil and power valve (among others). The inventors have found that in general, the average user should only be allowed to modify the fuel, ignition advance, oil and power valve of the automobile.

Figure 12:
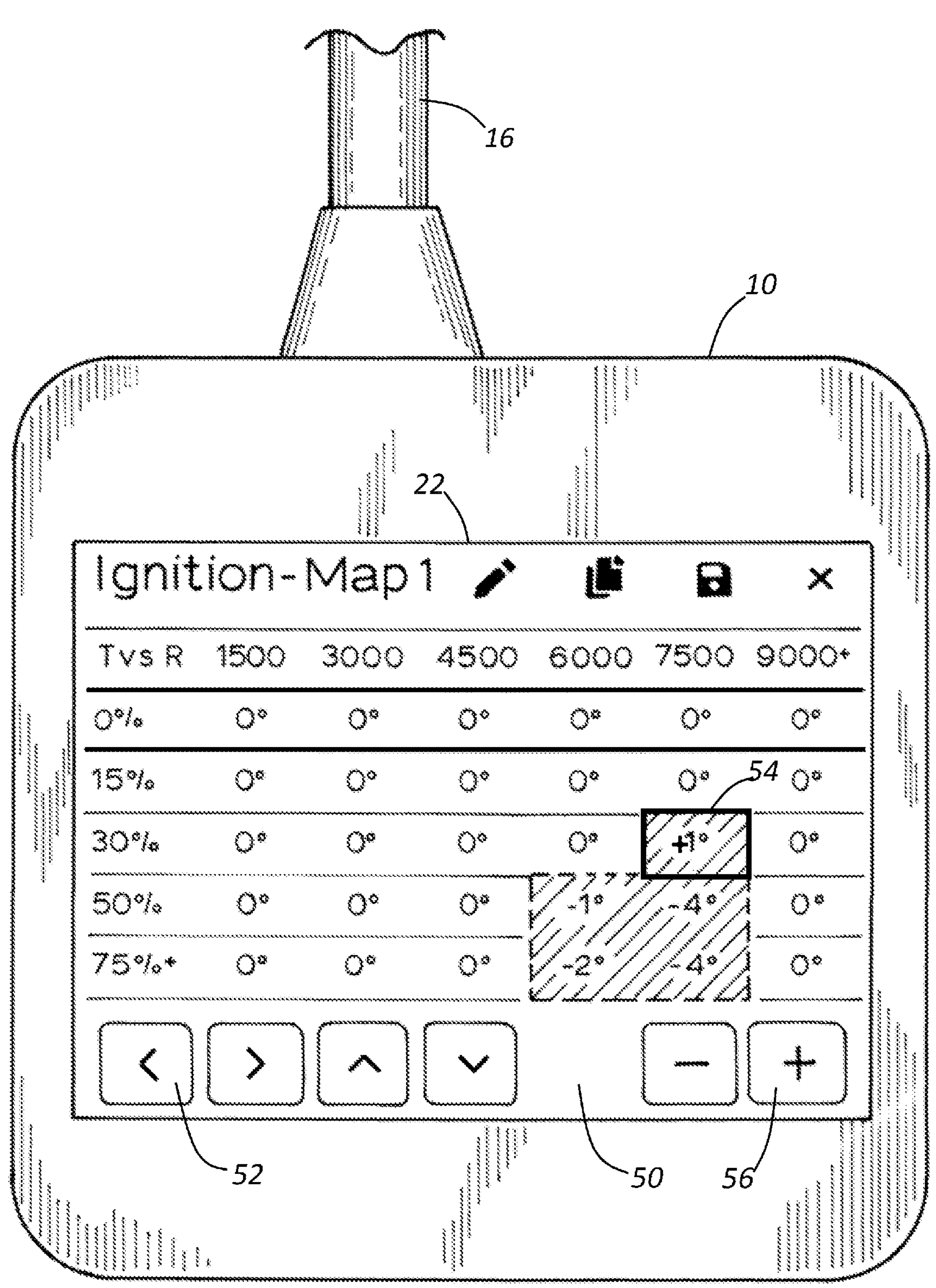
FIG. 12 is a representation of the ignition map interface of the module of FIG. 1.

FIG. 12 shows the ignition advance map interface 50 which is accessible by the user after swiping the fuel map interface 42 to the left. A user can use the arrow buttons 52 on the ignition advance map interface 50 to select any cell that the user is interested in modifying. In the example of FIG. 12, a cell 54 has been selected. The plus/minus buttons 56 can be used to modify the selected cell 54. Each cell relates to a combination of throttle opening and RPM. In the example of FIG. 11, the cell 54 is at 30 percent throttle and seven and half thousand RPM. A value of plus one degree has been entered, which means that the electronic control unit 20 will now fire the spark one degree further away than the previous value entered from the top dead centre position. Top dead centre is the point at which the piston is at highest point, as determined by the rotation of the crank shaft. By entering a value of plus one degree, the user is making ignition occur one degree earlier than what it previous was.

Figure 13:
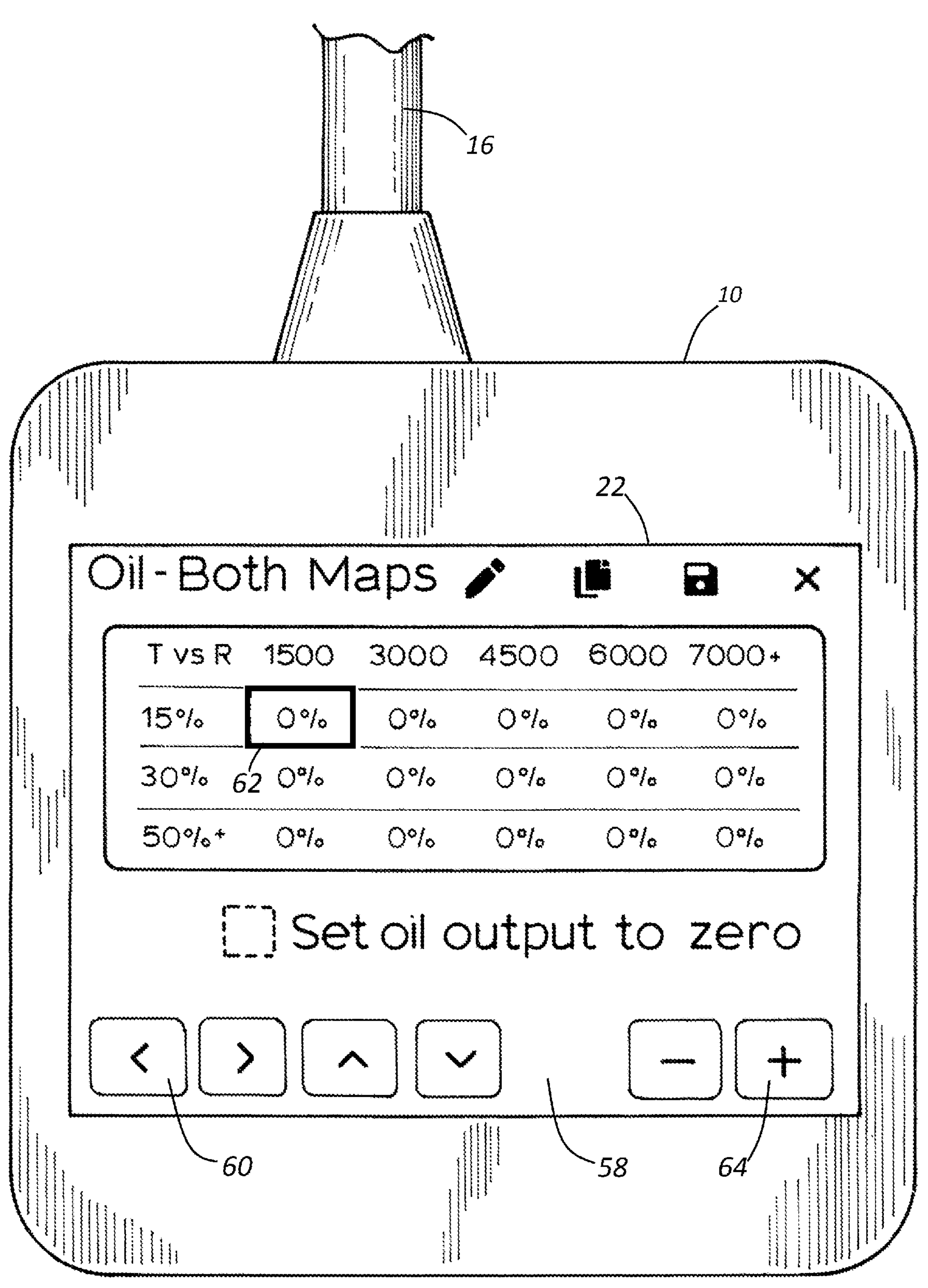
FIG. 13 is a representation of the oil map interface of the module of FIG. 1.

FIG. 13 shows the oil map interface 58 which is accessible by the user after swiping the ignition advance map interface 50 (shown in FIG. 12) to the left. A user can use the arrow buttons 60 on the oil map interface 58 to select any cell that the user is interested in modifying. In the example of FIG. 13, the cell 62 has been selected. The plus/minus buttons 64 can be used to modify the selected cell 62. Each cell relates to a combination of throttle opening and RPM. In the example of FIG. 13, the selected cell 62 is at zero percent change at fifteen hundred RPM and fifteen percent throttle. If this data was sent to the electronic control unit 20, then the electronic control unit 20 would continue to the same amount as before (because no increase or decrease has been programmed).

Figure 14:
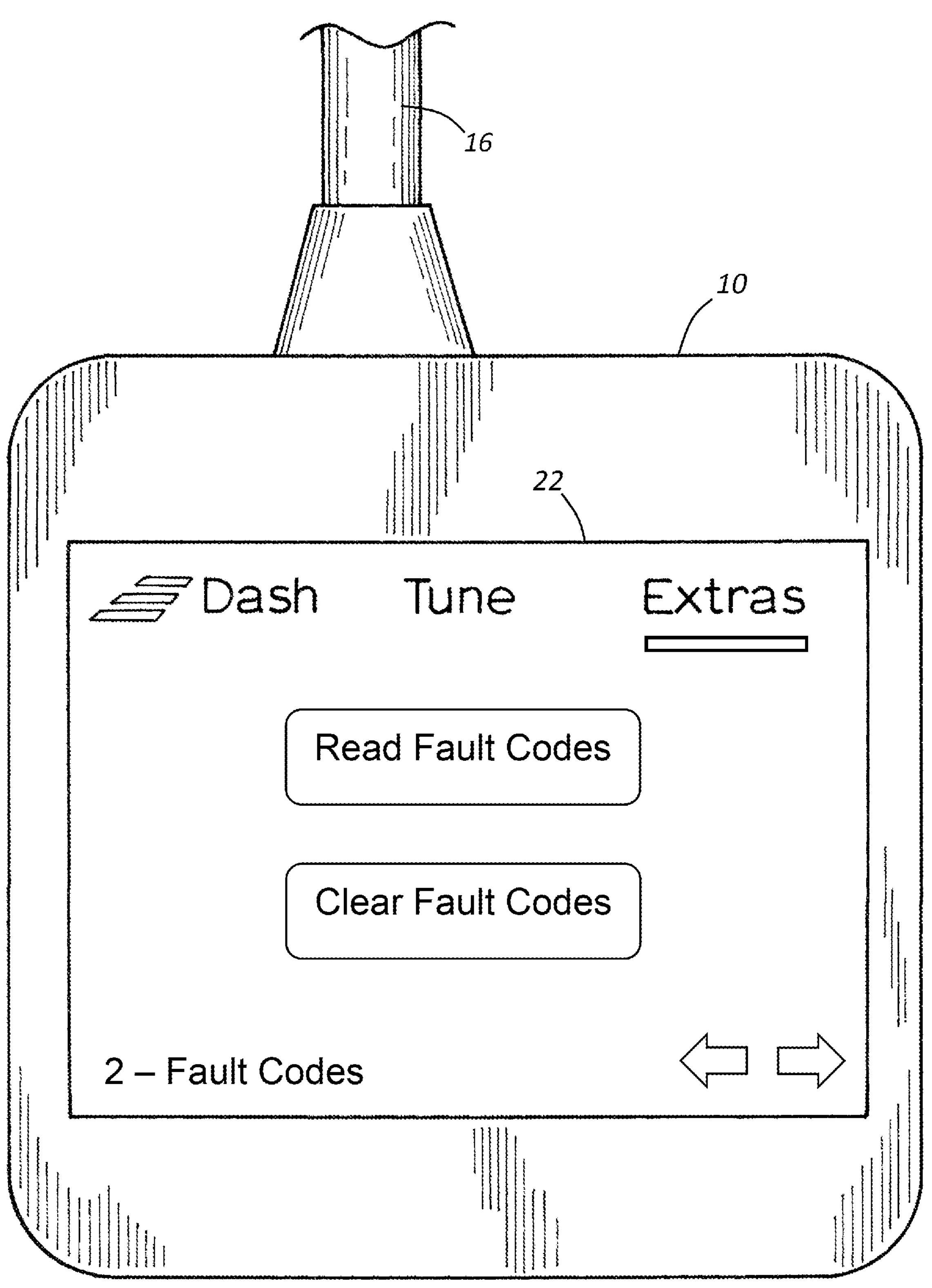
FIG. 14 is a representation of an extras interface of the module of FIG. 1 showing the ability of the module to read fault codes and clear them.

The module 10 has a number of additional 'extras' screens, such as including screens which show the registered user of the device, the screen brightness, the module identifier number, a diagnostic screen, a screen which shows which activation level has been purchased by the user for the module (depending on the level of expertise of the user). One extras screen is a service feature of the module 10 which enables the user to read and clear fault codes (shown in FIG. 14) registered by the electronic control unit 20. A fault code may occur when the electronic control unit senses an issue with the operation of the engine. A fault may relate to the temperature or pressure of the engine, the failure of an engine component, for example.

The module 10 has an inbuilt antenna (not shown) to enable the module 10 to transmit data to a mobile phone (or another computer) of a user. The module 10 can also log engine output data and transmit the data to a mobile phone of the user (not shown).

The module can be connected to an automobile electronic control unit for reprogramming the electronic control unit and then disconnected. Alternatively, it can remain connected to the automobile at the discretion of the user. The new parameters sent to the electronic control unit will remain indefinitely until changed again by the module.

Figure 15:
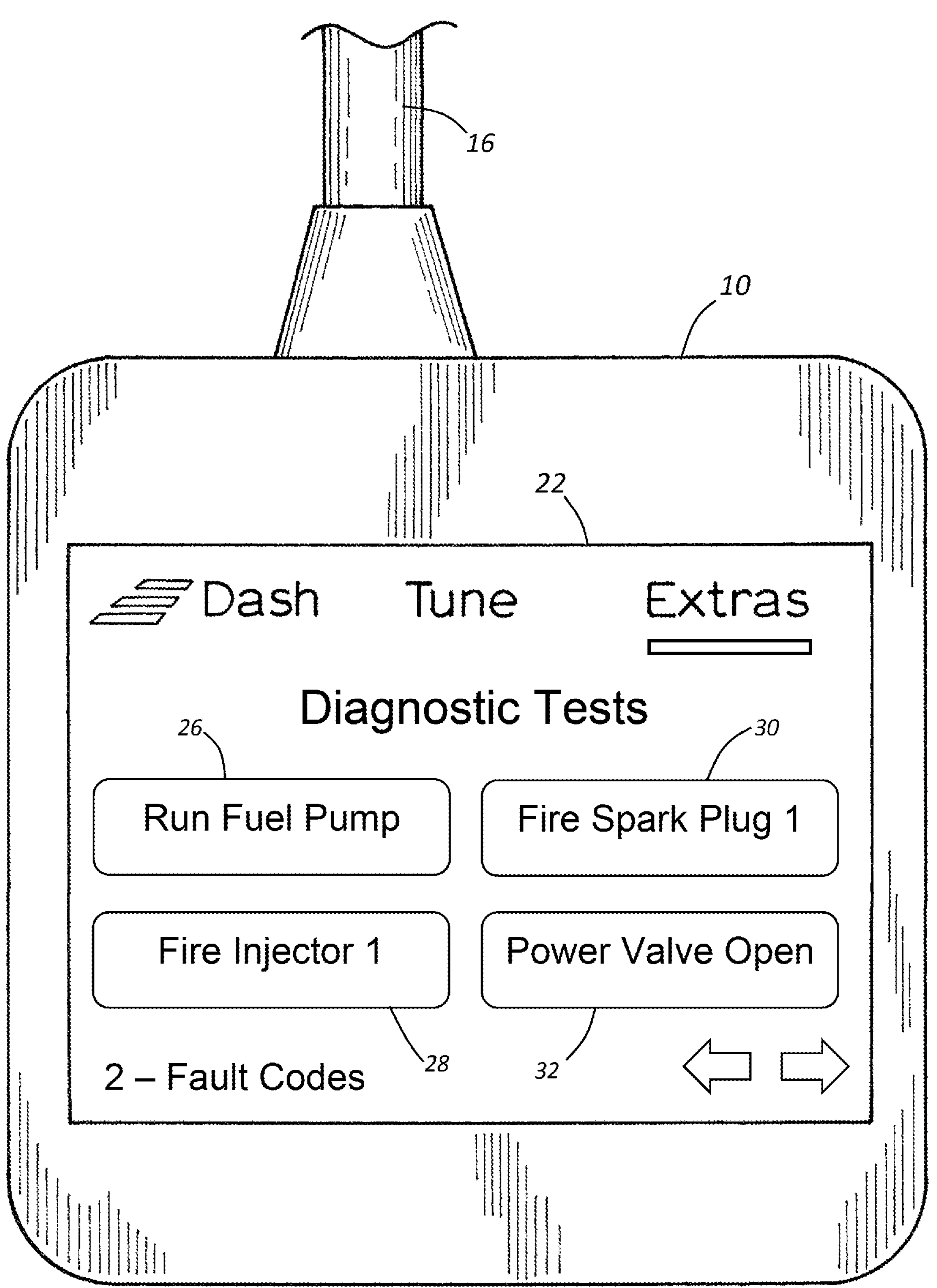
FIG. 15 is a representation of a diagnostic tests interface of the module of FIG. 1, showing physical buttons configured to operate individual diagnostic components of the motorcycle engine.

FIG. 15 shows buttons on the module 10 to operate different diagnostic tests for the motorbike 12.

Button 26 activates a fuel pump of the motorbike 12 to enable the operator to test the proper functionality of the fuel pump of the motorbike 12.

Button 28 activates a fuel injector 1 of the motorbike 12 to enable the operator to test the proper functionality of the fuel injector.

Button 30 activates a spark plug of the motorbike 12 to enable the operator to test the proper functionality of the spark plug.

Button 32 activates a power valve of the motorbike 12 to enable the operator to test the proper functionality of the power valve.

All of the aforementioned diagnostic tests are not present in the prior art on a unit which is mounted on the motorbike 12. The ability to perform these tests whilst on the road with the motorbike 12 confers a substantial advantage on the invention over the prior art.

Figure 16:
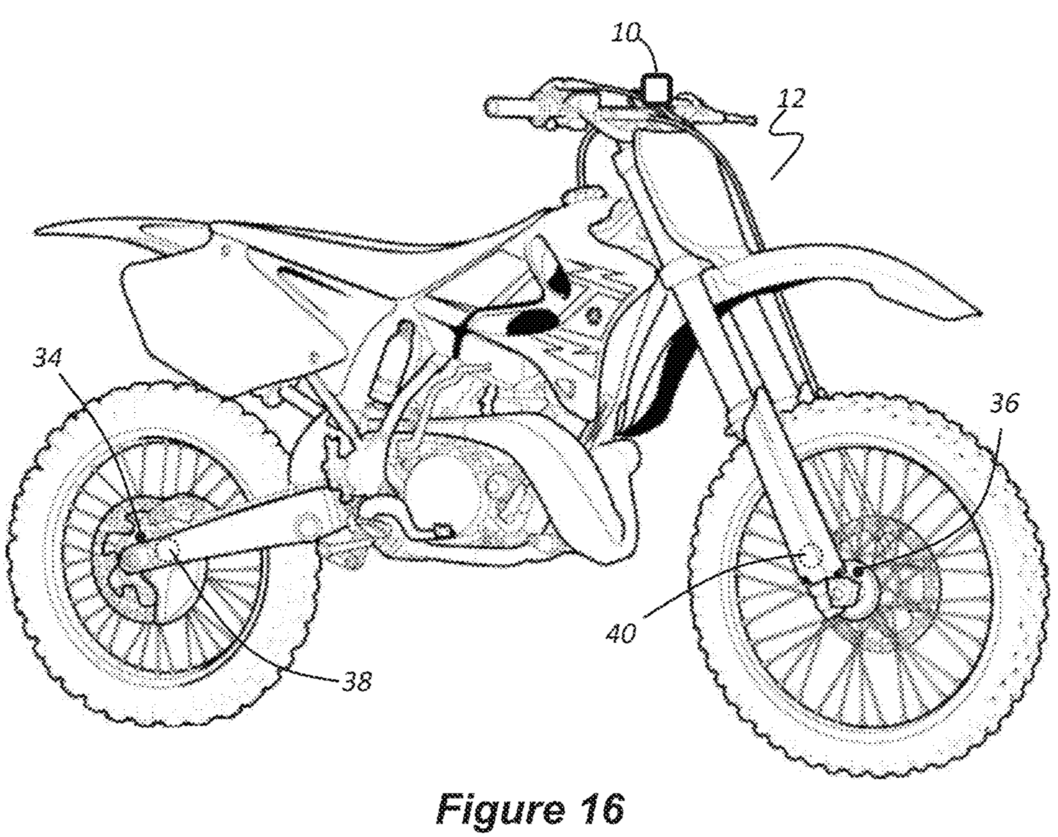
FIG. 16 is a side view of a motorcycle illustrating a tire traction diagnostic tool integrated with the handlebar-mounted diagnostic testing module of FIG. 1.

Another inventive feature of the present invention is a diagnostic tool for testing and adjusting tire traction. As shown in FIG. 16, this feature of the present invention comprises a rotation transmitter 34 mounted on a rear tire of the motorbike 12 and a rotation transmitter 36 mounted on a front tire of the motorbike 12. The transmitter 34 transmits a signal to a receiver 38 mounted on the rear tire of the motorbike 12. The transmitter 36 transmits a signal to a receiver 40 on the front tire of the motorbike 12.

If there is a loss of traction of the rear tire 12, then the module 12 will identify the increase in rear wheel rotational speed, versus front wheel rotational speed and issue a fault code on the screen 22 of the module 10. The module 10 will then immediately command the electronically control unit to operate in a lower power mode until rear wheel traction is regained. At that moment, it will then command the electronic control unit to return to the higher power mode. The module 10 will then clear the fault code once rear wheel traction has been regained.

The user can use the module 12 to change a parameter of the engine using the user interface screen 22 of the module 12 to test the ratio of rear wheel spin to front wheel spin of the motorbike 12. In this way, the user can adjust the traction control to suit the environmental conditions.

Any of the features described herein can be combined in any combination with any one or more of the other features described herein within the scope of the invention.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A diagnostic testing module for controlling an electronic control unit of a motorbike engine, the module comprising:

(a) a processor;

(b) a housing for the processor;

(c) an adaptor cable for connecting the processor to the electronic control unit;

(d) a user interface screen for controlling the processor of the module and presenting data to the user;

(e) a mount for attaching the housing to the motorbike's handlebars so that the module can travel with the motorbike, wherein the processor is programmed to:

i. generate a key code for authenticating with the electronic control unit;

ii. transmit the key code to the electronic control unit;

iii. allow a user to change a parameter of the engine using the user interface screen; and iv. display the current outputs of the engine via the user interface screen;

v. transmit the changed parameter to the electronic control unit;

vi. read fault codes produced by the engine control unit; and vii. enable a user to activate components of the engine to test those components and display their current outputs.

2. The module of claim 1, wherein the module can clear fault codes produced by the engine if those faults have been rectified by confirming the rectification through a secondary diagnostic test that activates the components to be performed by the module.

* * * * *